United States Patent [19]

Clarke

[11] Patent Number: 4,646,430
[45] Date of Patent: Mar. 3, 1987

[54] METHOD OF ASSEMBLING AN ELECTRIC STORAGE CELL

[75] Inventor: Donald B. Clarke, Harborne, United Kingdom

[73] Assignee: Lucas Industries, United Kingdom

[21] Appl. No.: 848,284

[22] Filed: Apr. 4, 1986

[30] Foreign Application Priority Data

Apr. 20, 1985 [GB] United Kingdom ................. 8510152

[51] Int. Cl.⁴ ............................................ H01M 2/25
[52] U.S. Cl. .................................... 29/623.1; 429/161
[58] Field of Search .................... 29/623.1, 623.3, 766, 29/790; 429/161, 160, 178, 211, 123

[56] References Cited

U.S. PATENT DOCUMENTS

| 885,562 | 4/1908 | Alt ........................................ 429/161 |
| 1,744,896 | 1/1930 | Holland ........................... 429/161 X |
| 2,883,443 | 4/1959 | Ruetschi et al. ..................... 429/161 |
| 3,640,775 | 2/1972 | Fitchman et al. ................... 429/161 |
| 4,521,498 | 6/1985 | Juergens .......................... 429/161 X |

Primary Examiner—Anthony Skapars
Attorney, Agent, or Firm—Andrus, Sceales, Starke & Sawall

[57] ABSTRACT

A method of assemblying an alkaline electric storage cell wherein, subsequent to the step of arranging positive and negative plates and separators to form a pack a plurality of plate lugs of the same polarity are introduced between the open limbs of a U-shaped clip the two limbs of the clip are pressed towards one another to trap between them the selected lugs, and an aperture is formed through the trapped lugs.

14 Claims, 5 Drawing Figures

METHOD OF ASSEMBLING AN ELECTRIC STORAGE CELL

This invention relates to alkaline electric storage cells for use alone, or in conjunction with similar cells in an electric storage battery.

A known alkaline cell includes alternate negative and positive plates spaced apart by separators, the plates and separators being parallel and being in facial contact. The positive and negative plates carry respectively positive and negative active material and a predetermined group of plates and separators is known as a plate pack. Each cell will include one or more plate packs.

Within the cell all negative plates are electrically connected to a negative output terminal of the cell, while all positive plates are similarly connected to a positive output terminal. Each of the positive and negative output terminals includes a screw threaded member capable of receiving a clamping nut, and each of the plates carries a protruding apertured lug whereby the plate is electrically connected to its respective output terminal. The lugs of the positive plates are positioned adjacent one side of the pack while the lugs of the negative plates are positioned adjacent the other side of the pack. The screw threaded member of the positive terminal extends through the apertures of the lugs of the positive plates and a clamping nut is engaged with the screw threaded member to clamp the lugs together thereby making a good electrical connection between the lugs and the positive terminal. The screw threaded member of the negative terminal similarly extends through the apertures of the lugs of the negative plates the negative lugs being clamped together by a clamping nut engaged with the screw threaded member of the negative terminal.

It is found that the process of aligning the lugs with the screw threaded member of the terminal, and then subsequently threading the lugs over the screw threaded member of the terminal is a time consuming and therefore expensive manual operation and does not lend itself readily to automated assembly techniques. It is therefore an object of the present invention to provide an assembly method wherein the above disadvantage is minimised.

In accordance with the present invention there is provided a method of assembling an alkaline electric storage cell wherein, subsequent to the step of arranging positive and negative plates and separators to form a pack, a plurality of plate lugs of the same polarity are introduced between the open limbs of a U-shaped clip, the two limbs of the clip are pressed towards one another to trap between them the selected lugs, and an aperture is formed through the trapped lugs.

Desirably, said selected lugs are trapped by a spaced pair of U-shaped clips, said aperture being formed between the clips.

Convenently all of the same polarity lugs of the pack are embraced by a clip or a spaced pair of clips, and all of the other polarity lugs of the pack are embraced by a second, similar clip or a second similar spaced pair of clips, said other polarity lugs being similarly formed with an aperture.

Alternatively the lugs of the same polarity are divided into two or more groups, and each group is provided with a respective clip or clips, each group after closure of its clip or clips being subjected to an operation to form the aperture through the lugs.

Preferably where a single clip is used then it is offset from the centre line of its respective lugs to permit the formation of a substantially centrally disposed aperture in the lugs.

Alternatively, where a single clip is used then its limbs are bifurcated to permit the formation of the aperture in the lugs between the two parts of each limb.

Alternatively where a single clip is used then each limb thereof has therein an aperture larger than the aperture to be formed in the lugs, the aperture of the lugs being formed within the confines of the apertures of the clip limbs.

Alternatively where a single clip is used an aperture is formed in the limbs thereof in the same operation which forms the aperture in the lugs.

Preferably the method includes the subsequent step of introducing a connecting member of a terminal of the appropriate polarity through the or each group of clipped and apertured lugs.

Desirably where the connecting member of the terminal extends through more than one group of lugs then the individually clipped groups are spaced apart along the length of the connecting member by conductive spacers.

Preferably said spacers engage the surface of the outermost lugs rather than engaging the respective clips.

Desirably the connecting member of each terminal includes screw threaded clamping means for achieving a good electrical connection between the connecting member and the or each respective group of lugs.

One example of the invention is illustrated in the accompanying drawings wherein FIG. 1 is a perspective view of part of a plate pack of an alkaline electric storage cell, FIG. 2 is a side elevation view partly in section of a three part plate pack and an associated output terminal, and FIGS. 3, 4 and 5 are perspective views respectively of alternative forms of lug clip.

Figure 1:
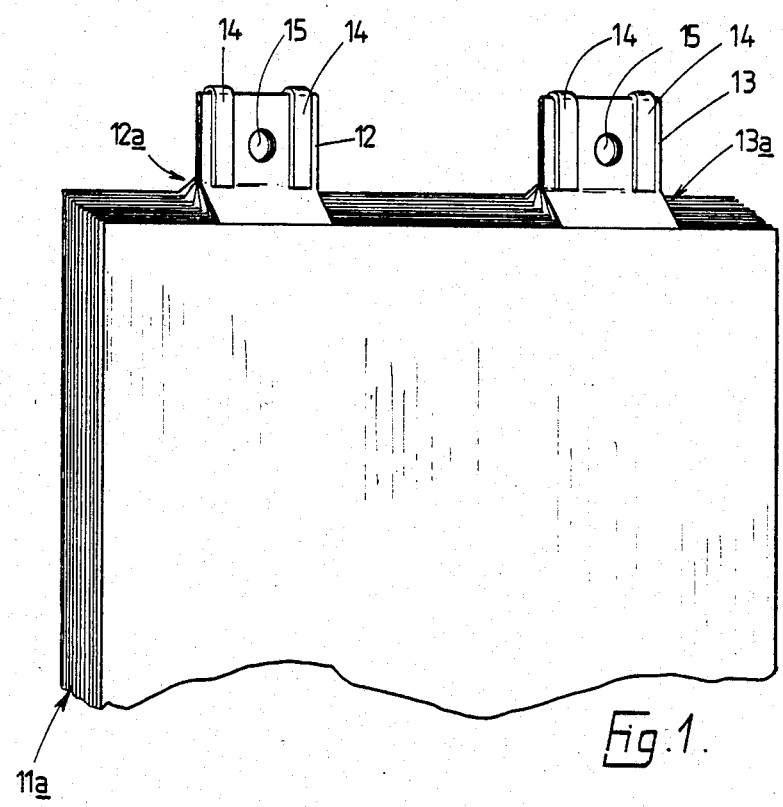
FIG. 1 shows a plate pack of an alkaline electric storage cell.
Figure 2:
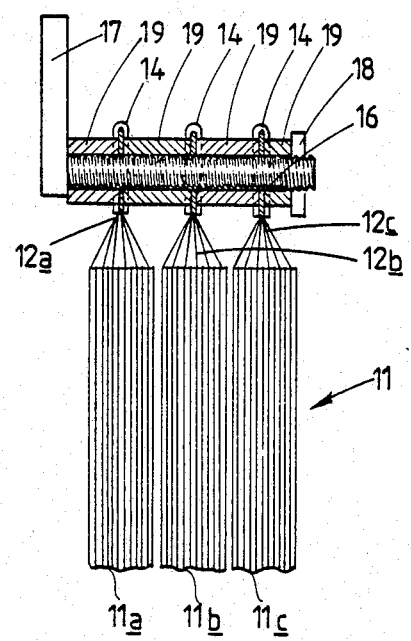
FIG. 2 is a side view of the structure of FIG. 1.

Referring first to FIGS. 1 and 2 of the drawings, the plates of the plate pack of the alkaline electric storage cell are of the type known as pressed plates wherein the carrier member of the plate, to which the active material is applied, is in the form of an apertured foil sheet of nickel, nickel alloy, or nickel plated mild steel, of approximately 100 micrometers thickness. The carrier members are of rectangular form and each includes an integral, outwardly projecting rectangular lug. Since the material of the carrier members is a foil then the lugs are flexible.

Positive plates and negative plates have the same type of carrier member, but in the positive plate the carrier member carries positive active material whereas in the negative plate the carrier member carries negative active material. The plates are arranged to form a pack having alternatively positive and negative plates spaced apart by micro-porous electrically insulating separators. As the pack is assembled positive plates are positioned with their lugs uppermost and adjacent one side of the pack while negative plates are positioned with their lugs uppermost and adjacent the opposite side of the pack. Thus as can be seen in FIG. 1, which shows part 11a of a pack 11, the lugs 12 of the positive plates are adjacent to the left hand side of the pack while the lugs 13 of the negative plates are adjacent the right hand side of the pack.

At this stage in the manufacture of the cell the lugs 12, 13 are simply extending upwardly from their respective pack or pack part. A decision must now be made as to whether or not all of the lugs of a given polarity can conveniently be bunched together to form a single lug group, or whether instead the pack has so many plates that the lugs of an individual polarity are separated into a number of groups. Considering the plate pack 11 shown in FIG. 2 the decision has been made to separate the positive lugs 12 into three separate groups 12a, 12b, 12c. Although not apparent from FIG. 2 the negative lugs are also arranged in three similar groups. The uppermost free edges of the lugs 12 of the group 12a are next introduced between the limbs of a pair of U-shaped clips 14 which are spaced apart across the width of the lugs 12. Each clip 14 is simply a plain strip of nickel, nickel alloy, or nickelplated mild steel foil which has been bent along its transverse centre line to form a U-shaped member the radius of the U being approximately 1 mm and the arrangement being such that the gap between the limbs of the clip is slightly greater than the overall thickness of the lug group. The uppermost free edges of the lugs are introduced between the limbs of each clip 14 which is then deformed in a simple press, which may be a hand operated device or an automatic apparatus, to bend the limbs of each clip 14 towards one another gripping and trapping between them the lugs 12 of the lug group 12a. The U-shape of the clips is such that during the pressing operation the limbs of the clips are deformed to grip the lugs 12 with substantially no spring-back of the limbs when the press is released as would for example be the case with a V-shaped clip. The two clips 14 of each lug group are spaced apart to provide a clear area of lug surface therebetween, in which area the lugs 12 of the group 12a are then punched as a single operation to produce an aperture 15 extending therethrough. Clearly it is extremely desirable for the punching operation to be performed in the same operating step as the pressing operation which deforms the clips 14 to grip the lugs. A relatively simple hand held or automated apparatus can be provided for this purpose.

Either simultaneously, or subsequently, each of the other lug groups of both the positive and negative plates are treated in the same way by the application of a clip 14 and the punching or piercing to form the aperture 15. It will be recognised that where the plate pack involves only a single group of lugs, then all positive lugs will be held together by a single pair of clips 14 and all negative lugs will be held together by a second similar pair of clips 14.

As mentioned previously the cell pack 11 illustrated in FIG. 2 comprises three sub-packs 11a, 11b, 11c and thus has three positive lug groups 12a, 12b, 12c, and three negative lug groups (one of which is seen at 13a in FIG. 1). As can be seen from FIG. 2 the three positive lug groups 12a, 12b, 12c have been collected together by respective clips 14 and have been punched so that each lug group together with its respective clips 14 defines a substantial and relatively rigid component. The positive output terminal includes a screw threaded metal rod 16 and a metal riser 17 which in use protrudes through the wall of the cell housing. The rod 16 is introduced through the apertures 15 of the lug groups 12a, 12b, 12c and a nut 18 is in screw threaded engagement with the rod 16. In order to avoid stressing the lugs as the nut 18 is used to clamp the lug groups in position, there are provided electrically conductive spacers 19 appropriately positioned along the length of the rod 16. The spacers 19 are so dimensioned that each will fit between the clips 14 of a lug group and will thus have its axial end surface in contact with the lug surface area between the clips 14 and not in contact with the clips 14. In this way the number of interfaces in the electrical connection and thus the voltage drop of the electrical connection is minimised. This is of particular importance where the cell is used with high rates of discharge.

The negative lug groups are treated in exactly the same manner to effect the electrical connection between the negative lug groups and negative output terminal.

As mentioned previously the risers 17 of the positive and negative output terminals will, in use, protrude through the cell casing so that external positive and negative electrical connections can be made to the cell.

It will be recognised that while the aforementioned method of assembly is particularly suited to pressed plates it may be used with other plate configurations where the connecting lugs lend themselves to grouping by means of a U-shaped clip for subsequent compaction and piercing.

The nature of the cell casing, and the manner in which electrolyte is supplied and retained is not of importance to the present invention.

Figure 3:
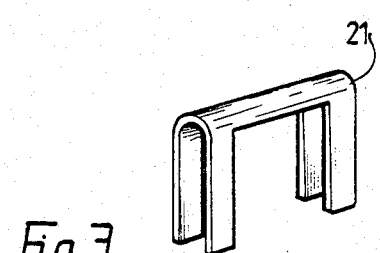
FIG. 3 shows a clip for the structure of FIG. 1.

It will be recognised that a variety of different clip arrangements can be utilised. In the above example a pair of spaced clips 14 are utilised. However, in some applications it would be possible to dispense with one of the two clips leaving each group of lugs held together by a single clip 14 positioned adjacent one edge of the lugs. As a further alternative a single clip 21 of the form illustrated in FIG. 3 could be utilised. The clip 21 is similar in function to a pair of clips 14, but is formed as a single item in effect comprising a pair of clips 14 held spaced apart by an integral bridge piece. It will be appreciated that if desired, after assembly of the lugs or lug groups on to the respective terminal rod 16; the clip or clips 14 (or the clip 21 as used in place of a clip or clips 14) can be removed.

Figure 4:
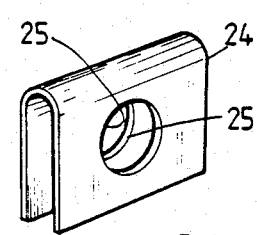
FIG. 4 shows an alternate embodiment of a clip for the structure of FIG. 1.

A further alternative is the use of a single clip 24 as shown in FIG. 4. It can be seen that the clip 24 is much wider than the clips 14, and in order to provide a free area of lug surface around the aperture 15, for example for engagement by a spacer 19, each limb of the clip 24 is formed with an aperture 25 the diameter of which significantly exceeds the diameter of the aperture 15. After the clip 24 has been bent to grip the lugs of its particular lug group the aperture 15 is formed through the lugs by applying a punching or piercing tool through the apertures 25 of the limbs of the clip.

It will be appreciated that the clips 21 and 24 provide a gripping action along both opposite edges of the lug group in the same manner as the use of a pair of clips 14. At the same time they both provide a free lug area around the aperture 15 for engagement by a spacer 19.

Figure 5:
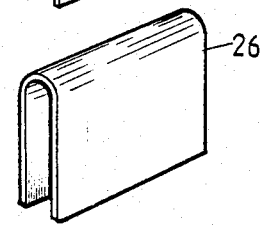
FIG. 5 shows a further alternate embodiment of a clip for the structure of FIG. 1.

FIG. 5 shows a clip form 26 which can be utilised where the cell is used alone, or in a battery which is not to be subjected to high rates of discharge. In such an environment it is acceptable to assemble the spacers 19 with their axial end faces in engagement with the clips of the lug groups rather than with the surface area of the lugs themselves. This procedure introduces additional interfaces into the electrical connection, but since high rates of discharge are not to be encountered then the additional voltage drops will not be significant. Thus, when using the clip 26 illustrated in FIG. 5 the aperture 15 is formed in the lugs after the clip has been bent to grip the lugs, and the aperture 15 is formed simultaneously in the limbs of the clip 26. Thus a single operation punches or pierces an aperture through the first limb of the clip 26, through the intervening lugs, and then through the second limb of the clip 26.

In an automated cell assembly method each collated sub-pack of plates is picked up by a robot arm and is transferred to a press wherein clips are applied to the lug groups, and are closed around the lug groups. The press also includes a piercing tool which, after closure of the clips, pierces the aperture 15 in the lugs. If clips 14, 21 or 24 are being utilised then the piercing tool pierces the aperture 15 in an appropriate position in relation to the clips. However, if clips 26 are being used then the piercing tool pierces the aperture 15 through the limbs of the clip as well as through the lugs.

Without releasing the sub-pack the robot arm then transfers the pack to a cell housing. The cell housing is open at an end wall, rather than along its top edge as is more usual. The terminal connecting rods 16 are already in position within the cell housing, and the cell housing is positioned with its open end wall uppermost, and thus the rods 16 extend vertically with their free ends adjacent the open end wall of the housing. The robot arm presents the sub-pack to the housing with the plane of the plates of the pack horizontal, and with the pack orientated to correspond to the orientation of the housing. The arm then lowers the sub-pack into the open end wall of the housing and releases the pack so that it can drop into the housing with the terminal rod 16 passing through the apertures 15 of their respective lug groups. Next the robot arm positions a spacer on each of the rods 16 and then supplies a further clipped and pierced sub-pack. This procedure is continued until the appropriate number of sub-packs and spacers have been introduced into the housing whereupon the robot arm applies a nut 18 to each of the rods 16 and tightens the nut to the appropriate locking torque.

Finally the cell housing will be closed either by a closure plate or by assembly to a housing of an adjacent cell when forming a battery.

I claim:

1. A method of assembling an alkaline electric storage cell wherein subsequent to the step of arranging positive and negative plates and separators to form a pack, a plurality of plate lugs of the same polarity are introduced between the open limbs of a U-shaped clip, the two limbs of the clip are pressed towards one another to trap between them the selected lugs and an aperture is formed through the trapped lugs.

2. A method as claimed in claim 1 wherein said selected lugs are trapped by a spaced pair of U-shaped clips, said aperture being formed between the clips.

3. A method as claimed in claim 1 wherein all of the same polarity lugs of the pack are embraced by a clip and all of the other polarity lugs of the pack are embraced by a second, similar clip, said other polarity lugs being similarly formed with an aperture.

4. A method as claimed in claim 2 wherein all lugs of the same polarity lugs of the pack are embraced by a spaced pair of clips, and all of the other polarity lugs of the pack are embraced by a second, similar spaced pair of clips said other polarity lugs being similarly formed with an aperture.

5. A method as claimed in claim 1 wherein the lugs of the same polarity are divided into two or more groups, and each group is provided with a respective clip, each group after closure of its clip being subjected to an operation to form the aperture through the lugs.

6. A method as claimed in claim 2 wherein the lugs of the same polarity are divided into two or more groups, and each group is provided with respective spaced pair of clips, each group after closure of its clips being subjected to an operation to form the aperture through.

7. A method as claimed in claim 1 or claim 3 or claim 5 wherein said U-shaped clip is offset from the centre line of its respective lugs to permit the formation of a substantially centrally disposed aperture in the lugs.

8. A method as claimed in claim 1 or claim 3 or claim 5 wherein the limbs of said U-shaped clip are bifurcated to permit the formation of the aperture in the lugs between the two parts of each limb.

9. A method as claimed in claim 1 or claim 3 or claim 5 wherein each limb of said U-shaped clip has therein an aperture larger than the aperture to be formed in the lugs, the aperture of the lugs being formed within the confines of the apertures of the clip limbs.

10. A method as claimed in claim 1 or claim 3 or claim 5 wherein an aperture is formed in the limbs of said U-shaped clip in the same operation which forms the aperture in the lugs.

11. A method as claimed in claim 1 including the subsequent step of introducing a connecting member of a terminal of the appropriate polarity through the clipped and apertured lugs.

12. A method as claimed in claim 11 wherein the connecting member of the terminal extends through more than one group of lugs and the individually clipped groups are spaced apart along the length of the connecting member by conductive spacers.

13. A method as claimed in claim 12 wherein said spacers engage the surface of the outermost lugs rather than engaging the respective clips.

14. A method as claimed in claim 11 wherein said connecting member of each terminal includes screw threaded clamping means for achieving a good electrical connection between the connecting member and the lugs.

* * * * *